(12) United States Patent
Stanifer et al.

(10) Patent No.: US 12,070,976 B2
(45) Date of Patent: *Aug. 27, 2024

(54) UNDERBED HITCH MOUNTING SYSTEM

(71) Applicant: HORIZON GLOBAL AMERICAS INC., Plymouth, MI (US)

(72) Inventors: Eric J. Stanifer, Mishawaka, IN (US); Richard W. McCoy, Granger, IN (US); Brian W. Ward, Swartz Creek, MI (US)

(73) Assignee: HORIZON GLOBAL AMERICAS INC., Plymouth, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/100,026

(22) Filed: Jan. 23, 2023

(65) Prior Publication Data

US 2023/0406053 A1 Dec. 21, 2023

Related U.S. Application Data

(63) Continuation of application No. 17/222,289, filed on Apr. 5, 2021, now Pat. No. 11,560,027, which is a continuation of application No. 16/564,188, filed on Sep. 9, 2019, now Pat. No. 10,967,689, which is a continuation of application No. 15/496,073, filed on Apr. 25, 2017, now Pat. No. 10,406,873.

(60) Provisional application No. 62/327,486, filed on Apr. 26, 2016.

(51) Int. Cl.
*B60D 1/48* (2006.01)
*B60D 1/01* (2006.01)
*B60D 1/06* (2006.01)

(52) U.S. Cl.
CPC ............ *B60D 1/488* (2013.01); *B60D 1/015* (2013.01); *B60D 1/06* (2013.01); *B60D 1/485* (2013.01)

(58) Field of Classification Search
CPC .......... B60D 1/488; B60D 1/015; B60D 1/06; B60D 1/485
See application file for complete search history.

(56) References Cited

U.S. PATENT DOCUMENTS

| | | | | |
|---|---|---|---|---|
| 9,067,468 | B2 * | 6/2015 | Stanifer | B60D 1/488 |
| 2003/0015855 | A1 * | 1/2003 | McCoy | B62D 53/08 |
| | | | | 280/433 |
| 2003/0038452 | A1 * | 2/2003 | Lindenman | B62D 53/0828 |
| | | | | 280/438.1 |
| 2003/0209878 | A1 * | 11/2003 | Lindenman | B62D 53/08 |
| | | | | 280/433 |
| 2003/0209879 | A1 * | 11/2003 | Lindenman | B60D 1/015 |
| | | | | 280/438.1 |
| 2009/0295122 | A1 * | 12/2009 | Withers | B62D 53/08 |
| | | | | 280/476.1 |

(Continued)

Primary Examiner — Tony H Winner

(57) ABSTRACT

An underbed hitch mounting system is described. The mounting system may be utilized for towing vehicles wherein the mounting system may selectively accommodate either a fifth wheel hitch or a gooseneck hitch. The mounting system may include at least one rail capable of being connected to a vehicle frame, wherein the rail includes at least one socket. The socket may be engaged with a receiving member, wherein the receiving member may be engaged with a leg of a fifth wheel hitch. A mid rail may be connected to the rails and may include a hitch ball socket that is capable of engagement with a hitch.

15 Claims, 16 Drawing Sheets

(56) References Cited

U.S. PATENT DOCUMENTS

| | | | | |
|---|---|---|---|---|
| 2010/0109285 A1* | 5/2010 | Stanifer | ............ | B62D 53/0828 |
| | | | | 280/433 |
| 2012/0145851 A1* | 6/2012 | McCoy | ................. | B60D 1/488 |
| | | | | 248/221.11 |
| 2013/0193671 A1* | 8/2013 | McCoy | ................. | B60D 1/488 |
| | | | | 280/495 |
| 2013/0307248 A1* | 11/2013 | McCoy | ................. | B60D 1/075 |
| | | | | 280/495 |
| 2014/0035257 A1* | 2/2014 | Van Der Knaap | ..... | B62D 53/08 |
| | | | | 280/438.1 |
| 2015/0102584 A1* | 4/2015 | Hartleip | ................... | B60D 1/06 |
| | | | | 280/511 |
| 2016/0107492 A1* | 4/2016 | McCoy | ................... | B60D 1/44 |
| | | | | 280/438.1 |

* cited by examiner

UNDERBED HITCH MOUNTING SYSTEM

TECHNICAL FIELD AND RELATED APPLICATIONS

This application is a continuation of U.S. patent application Ser. No. 17/222,289 filed Apr. 5, 2021, titled "Underbed Hitch Mounting System," which is a continuation of U.S. patent application Ser. No. 16/564,188, filed on Sep. 9, 2019, now U.S. Pat. No. 10,967,689, titled "Underbed Hitch Mounting System," which is a continuation of U.S. patent application Ser. No. 15/469,073, filed on Apr. 25, 2017, now U.S. Pat. No. 10,406,873, titled "Underbed Hitch Mounting System," which claims priority to U.S. Provisional Patent Application Ser. No. 62/327,486 filed on Apr. 26, 2016, each of which are hereby incorporated by reference.

The present invention relates generally to a towing apparatus and, more particularly, to an underbed hitch mounting system.

BACKGROUND

Many vehicles are designed to transport freight, goods, merchandise, personal property, and other such cargo. Often, a hitch assembly is utilized to connect a towed vehicle or trailer to a towing vehicle, such as a truck for example, to increase the capacity to transport goods. Many types of coupling devices have been developed for providing this connection between a towing vehicle and a towed vehicle.

It is well known to utilize a trailer hitch to connect a trailer to a towing vehicle. There are many different types of trailer hitches that may be attached to the towing vehicle in a variety of ways, depending on the type of hitch to be used. Some of the most common types of hitches include gooseneck, fifth wheel, front mount, and the like. Often, the type of hitch used to connect a trailer and a vehicle is determined by the size, shape and other features of the trailer. For example, large trailers such as semitrailers and campers often require a fifth wheel hitch, whereas, small and mid-sized trailers, such as boat trailers, are better suited for gooseneck trailer hitches. Typically, trailers are connected to a towing vehicle by way of a ball hitch secured to the vehicle and a ball socket coupling mechanism on the trailer that mounts over the ball and thereby allows for the trailer to pivot behind the towing vehicle.

Due to the size and weight of many trailers, towing a trailer may cause unsafe conditions for the towing vehicle, such as fishtailing or other unsafe effects. To avoid these unwanted effects, the weight of the trailer is preferably, evenly balanced and distributed over the wheels of the towing vehicle. Thus, the hitch may be connected to the frame or base of the towing vehicle near the vehicle's center of gravity, and fifth wheel and gooseneck hitches mounted to pickup trucks are often connected to the truck frame underneath the bed of the truck.

Traditional fifth wheel hitches include a head assembly for receiving a king pin on a trailer, a base having a plurality of legs, and one or more mounting rails. The mounting rails may be permanently fixed to the frame of a vehicle, such as a pickup truck. For example, the mounting rails may be connected between two portions of a pickup truck frame underneath the truck bed. The mounting rails may include a plurality of holes for receiving the legs of the fifth wheel hitch.

Corresponding openings may be cut in the truck bed and aligned with the holes in the mounting rails. The legs of the fifth wheel hitch may be connected to holes in the mounting rails through the openings in the truck bed, thereby securing the fifth wheel hitch to the frame of the truck. When the fifth wheel hitch is not in use, the legs may be disconnected from the holes in the rails and the hitch may be removed from the bed of the truck. Caps may be placed over the holes to allow the truck bed to be used for other purposes.

Traditional gooseneck hitches also mount to a pickup truck frame, beneath the bed of a truck. A gooseneck hitch is designed for use in a pickup truck similar to a fifth wheel. The difference is that the gooseneck uses a ball and coupler verses a kingpin and pin receiver. Gooseneck hitches include a mounting plate configured to connect to the frame of a truck, a receptacle in the mounting plate configured to receive a ball hitch, and a hitch ball removably connected to the receptacle and configured to engage a coupling member of the trailer. An opening in the bed of the truck is aligned with the receptacle in the mounting plate, allowing the hitch ball to connect to the receptacle through the opening in the truck bed. The hitch balls themselves are typically removable or retractable so that when the hitch is not in use, the hitch ball may be removed or retracted when not in use, so as not to obstruct the bed of the pick-up truck in any significant manner.

Towing vehicles are generally adapted to accommodate either a fifth wheel hitch or a gooseneck hitch, but not both. As previously noted, fifth wheel hitches and gooseneck hitches are preferably mounted to the vehicle frame near the vehicle's center of gravity but, because fifth wheel hitches and gooseneck hitches use different mounting configurations, only one hitch can physically occupy that location. Thus, converting a towing vehicle from a fifth wheel hitch to a gooseneck hitch (or vice versa) is inefficient and can be quite time and labor intensive.

SUMMARY

An apparatus for towing vehicles that selectively accommodates either a fifth wheel hitch or a gooseneck hitch without the need for a conversion process would be welcomed. Accordingly, an underbed hitch mounting system is described. The mounting system may be utilized for towing vehicles wherein the mounting system may selectively accommodate either a fifth wheel hitch or a gooseneck hitch. The mounting system may include at least one rail connectable to a vehicle frame, wherein the rail includes at least one socket. The socket engages with a receiving member, while the receiving member engages a leg of a fifth wheel hitch. A separate mid rail, connectable to the rails, includes a gooseneck hitch ball socket.

In one aspect, the invention comprises any combination of the following features:

A pair of parallel end members laterally spaced apart;

First and second cross rails positioned at non-orthogonal angles relative to the end members, wherein the first and second cross rails intersect between the end members to define a mid rail section having a hitch ball socket;

Four receiving members, wherein each cross rail has two receiving members formed in opposing ends with the hitch ball socket disposed at a distance between the two receiving members, wherein the four receiving members define a quadrilateral periphery to cooperate with attachment mechanisms for a fifth wheel hitch;

Wherein the distance between the two receiving members is the same for each cross rail;

Wherein the cross rails form an X-shape;

Wherein the cross rails do not form right angles at the mid rail section;

Further comprising a pair of parallel bracing members, each bracing member attached to and transversely spanning between the parallel end members so as to define a second quadrilateral boundary, wherein the quadrilaterial periphery is contained completely within the second quadrilateral boundary;

Wherein opposing ends of each member are attached to separate vehicle framework rails Wherein the quadrilateral periphery has a rectangular shape;

Wherein each end member includes at least one of a mounting flange and a mounting aperture;

Wherein the receiving members attach to a fifth wheel hitch;

Wherein the cross rails are welded;

Wherein the cross rails are monolithically formed;

Wherein a flange is formed on each end member and wherein a plurality of mounting apertures are formed within each flange; and Wherein the mounting apertures cooperate with a vehicle frame to attach the mounting system to a vehicle.

In another aspect, the invention comprises any combination of the following features:

A pair of parallel cross members and a pair of parallel end members orthogonal to the cross members, wherein the cross members and end members collectively define a quadrilateral periphery;

A mid rail connected to each end member without intersecting with either of the cross members;

Wherein the mid rail includes a hitch ball socket;

Wherein each cross member includes a receiving member formed within the quadrilateral periphery;

Wherein the quadrilateral periphery has a rectangular shape;

Wherein the receiving members attach to a fifth wheel hitch;

Wherein each end member includes at least one of a mounting flange and a mounting aperture;

Wherein a flange is formed on each end member and wherein a plurality of mounting apertures are formed within each flange;

Wherein each flange is formed at a right angle;

Wherein the mid rail is parallel to the cross members; and

Wherein the mounting apertures cooperate with a vehicle frame to attach the mounting system to a vehicle.

Specific reference is made to the appended claims, drawings, and description below, all of which disclose elements of the invention. While specific embodiments are identified, it will be understood that elements from one described aspect may be combined with those from a separately identified aspect. In the same manner, a person of ordinary skill will have the requisite understanding of common processes, components, and methods, and this description is intended to encompass and disclose such common aspects even if they are not expressly identified herein.

DESCRIPTION OF THE DRAWINGS

Operation of the invention may be better understood by reference to the detailed description taken in connection with the following illustrations. These appended drawings form part of this specification, and any written information in the drawings should be treated as part of this disclosure. In the same manner, the relative positioning and relationship of the components as shown in these drawings, as well as their function, shape, dimensions, and appearance, may all further inform certain aspects of the invention as if fully rewritten herein.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. As such, the following description is presented by way of illustration only and should not limit in any way the various alternatives and modifications that may be made to the illustrated embodiments and still be within the spirit and scope of the invention.

As used herein, the words "example" and "exemplary" mean an instance or illustration but do not necessarily indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

FIGS. 1-31 illustrate various aspects of underbed hitch mounting systems 10, 100, 200, 300, 400, 500, 600, 700, and 800. As indicated throughout the drawings, reference elements sharing the same final two digits may possess certain common features and characteristics in comparison to systems shown in other aspects. Therefore, the disclosure should be read broadly to include and cover all series of numbers possessing the same final two digits, particularly with respect to the rails, mid rails, and other features integrated with or formed thereon.

Figure 2:
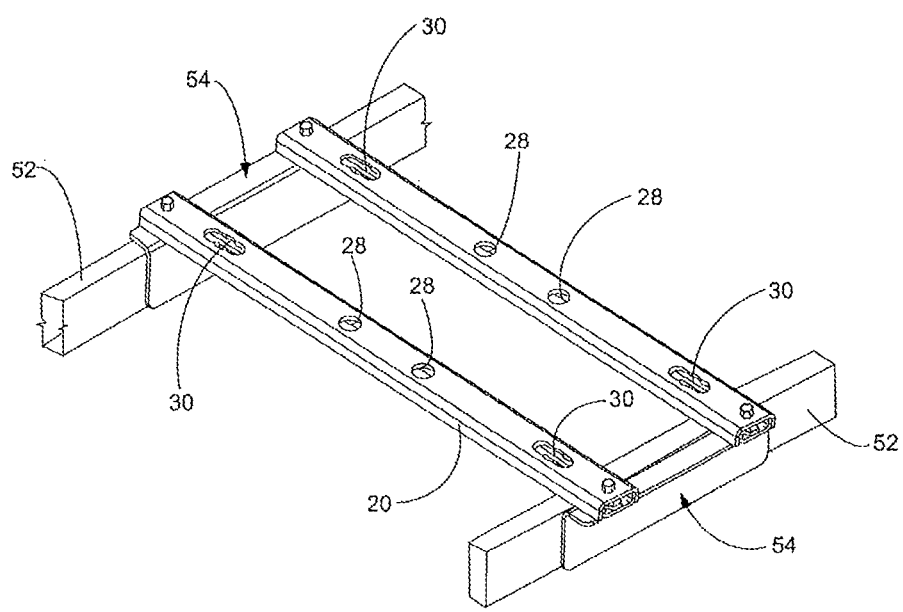
FIG. 2 illustrates a perspective view of a rail assembly.
Figure 7:
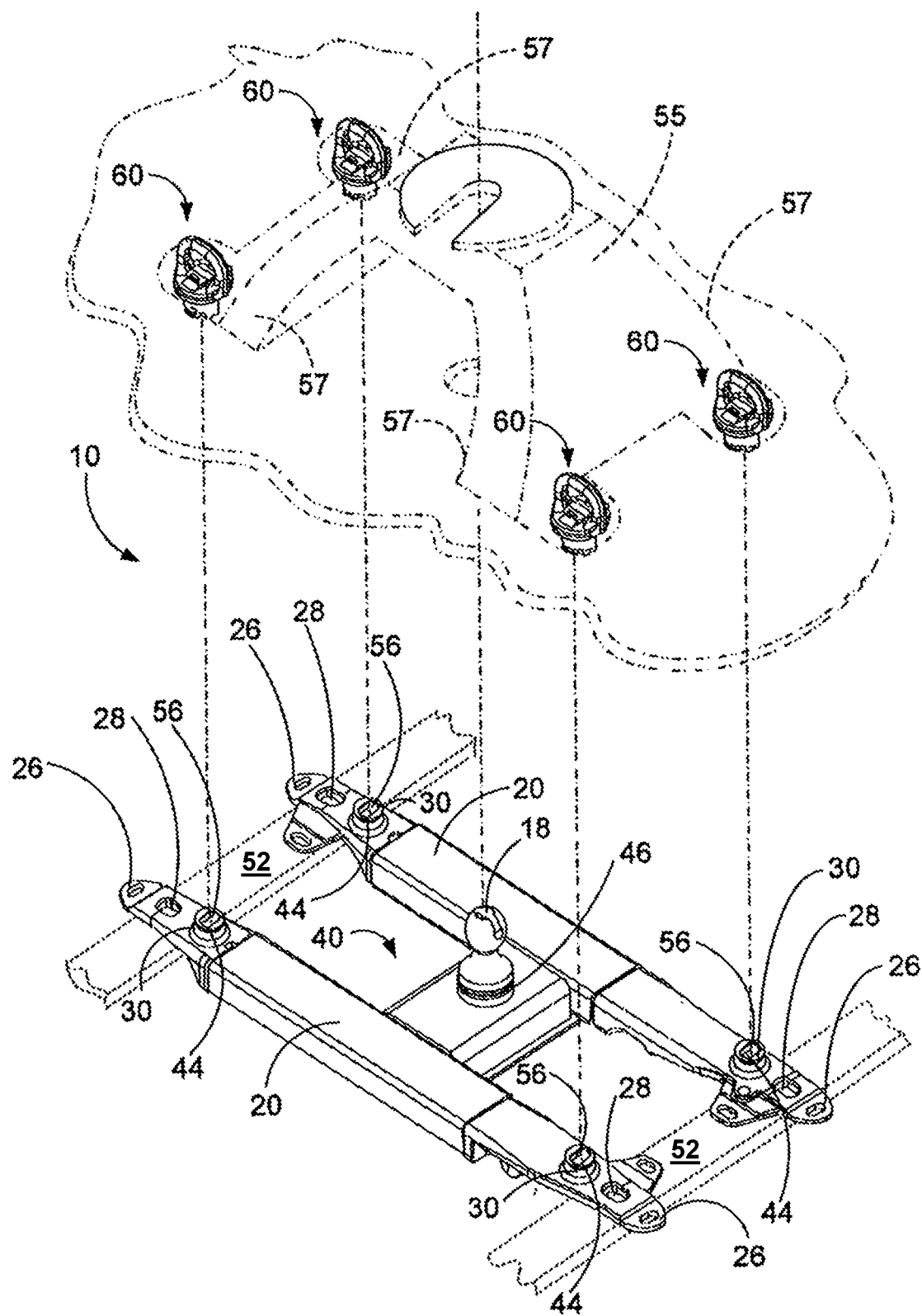
FIG. 7 illustrates a perspective view of embodiments of an underbed hitch mounting system with a fifth wheel hitch in phantom immediately over the underbed hitch mounting system.

These systems may be used with towing vehicles that allow for selectively accommodating either a fifth wheel hitch 55 or a gooseneck hitch which is connected via hitch ball 18, as seen in the alternative in FIG. 7. Trailer hitches, such as a gooseneck or fifth wheel hitch 55, may be mounted to a truck bed. These types of hitches are often mounted beneath the truck bed in conjunction with the truck's own frame rails 52, such as with cross members or rails 20 as seen in FIGS. 2 and 7. The hitch mounting system 10 may include any appropriate feature such as those as shown and described as being part of an under bed gooseneck hitch mounting system shown and described in U.S. Pat. No. 8,414,009, which is hereby incorporated by reference. Further, while the orientation of rails 52 is shown with respect to system 10 in these figures, it will be understood that similar attachment may be made according to the other systems 100, 200, 300, 400, 500, 600, 700, and 800 described herein.

The underbed hitch mounting system 10 may include at least one rail mount or cross member 20 and at least one mid rail or adapter plate 40. For example, the mounting system 10 may include two rails 20 and one mid rail or adapter plate 40. In the embodiment of FIGS. 1-7, the mounting system 10 includes two rails 20 and only one mid rails 40; however, various other embodiments contemplate a plurality of rails 20 and/or mid-rails 40 in various arrangements, including but not limited to X-shaped, parallel, perpendicular (e.g., H- or I-shaped), both parallel and perpendicular (so as to form a quadrilateral shape along the outer-most periphery), or various combinations of parallel, perpendicular, and angled configurations—all of which are shown in FIGS. 8-19 and 23-31. Thus, while the underbed hitch mounting system 10 and some of the other systems may be shown and described as having two rails and one mid rail or adapter plate 40, it is to be understood that there may be any appropriate number of rails or adapter plates and it should not be limited to that shown and described herein.

In all of these embodiments, the rails 20 are configured to support a gooseneck hitch and a fifth wheel hitch based upon the relative positioning of the rails 20 and mid rails. Typical fifth wheel hitches 55 may include a plurality of legs 57 to connect the hitch to a vehicle, while typical gooseneck connections are made at a center point (in both the x- and y-axes, i.e., the transverse and longitudinal orientations of the bed/vehicle/system) of the system 10.

The rails 20 may be of any appropriate shape or size, such as a generally tubular, square or rectangular shape. Each rail 20 may include one or more sockets 30 (FIGS. 1, 2 and 4-6). The sockets 30 may be of any appropriate shaper or size, such as a generally ovular, circular or rectangular shape. The sockets 30 may be configured to receive and support the legs 57 of a fifth wheel hitch 55. The legs 57 may be secured to the rails 20 through the sockets 30 by any appropriate means, such as by fasteners, being welded, or the like.

The rails 20 may include connecting holes or mounting apertures 28 (FIGS. 1, 2, 4-6, and 8-31). The mounting apertures 28 may be of any appropriate shape or size, such as a generally circular, ovular or rectangular shape. There may be any number of appropriate mounting apertures 28 and should not be limited to that shown and described herein.

Figure 1:
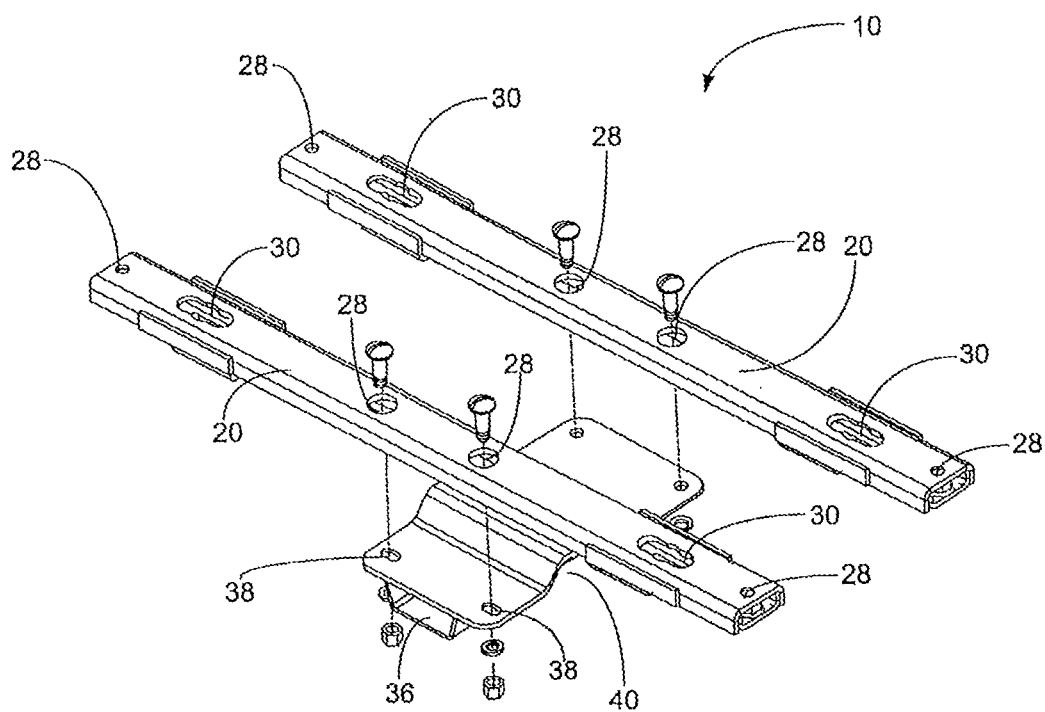
FIG. 1 illustrates a perspective and partially exploded view of an underbed hitch mounting system in an embodiment of the invention.
Figure 4:
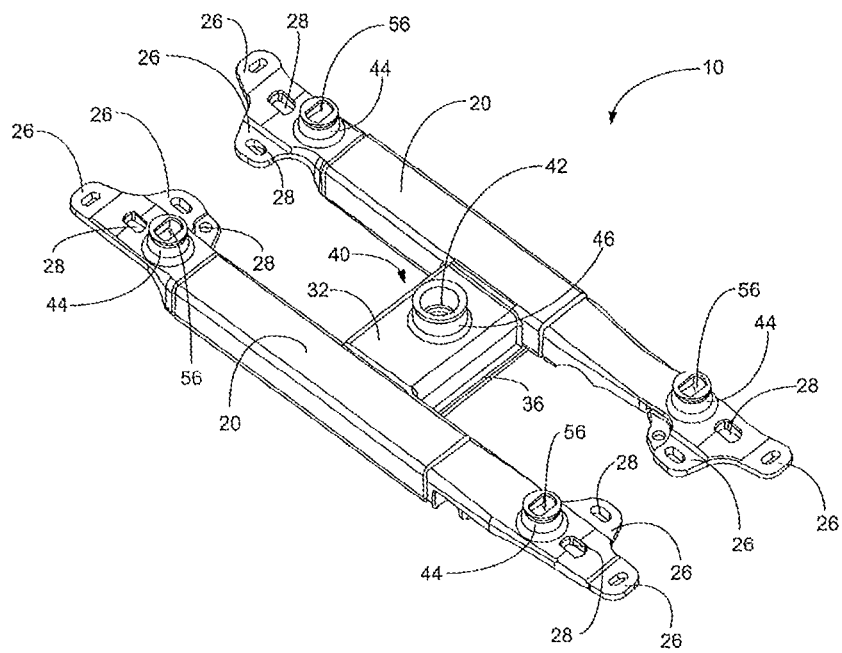
FIG. 4 illustrates a perspective view of an underbed hitch mounting system in an embodiment of the invention.

The mounting apertures 28 may be utilized for connecting another member to the rails 20, such as the adapter plate 40 or attachment brackets 54 (see FIGS. 1, 2 and 4). The mounting apertures 28 may also be used to connect the rails 20 of the hitch mounting system 10 to the underbed of the towing vehicle frame 52. For example, the rails 20 may be connected to the towing vehicle frame 52, such as underneath the truck bed (not shown).

The rails 20 may include one or more attachment brackets 54 (FIG. 2). For example, the mounting system 10 may have two attachment brackets 54. The attachment brackets 54 may be utilized for connecting the rails 20 to the frame 52. The rails 20 may be connected to the attachment brackets 54 by any appropriate means, such as with fasteners, welding, monolithically formed, or the like. The attachment brackets 54 may be of any appropriate shape or size, such as a general L-shape, rectangular plate or the like. The attachment brackets 54 may be sized and shaped to engage a vehicle frame.

Typical vehicle frames 52 may include two generally parallel steel members. An end of each rail 20 may connect to a first member of the frame 52 and an opposite end of the rail 20 may connect to a second member of the vehicle frame 52 (FIGS. 2, 8-10, and 14-19). The cross members or rails 20 may extend between the mounting brackets 54. The rails 20 may be of a length sufficient to span the distance between the mounting brackets 54 when those brackets engage the vehicle framework 52. The attachment brackets 54 may form a generally L-shaped bracket to engage the frame 52. The attachment brackets 54 may be attached to the frame 52 by any appropriate means, such as with fasteners, welding, monolithically formed, or the like.

The mid rail or adapter plate 40 may be of any appropriate shape or size, such as a generally rectangular or tubular shape that may span the length between the rails 20 (FIGS. 1, 4, 8-16 and 20-31). The mid rail or adapter plate 40 may be configured to connect to the rails 20. The mid rail 40 may also attach to or overlap with another mid rail 40. The mid rail or adapter plate 40 may be attached to the rails by any appropriate means, such as with fasteners, welding, monolithically formed, or the like.

Figure 3:
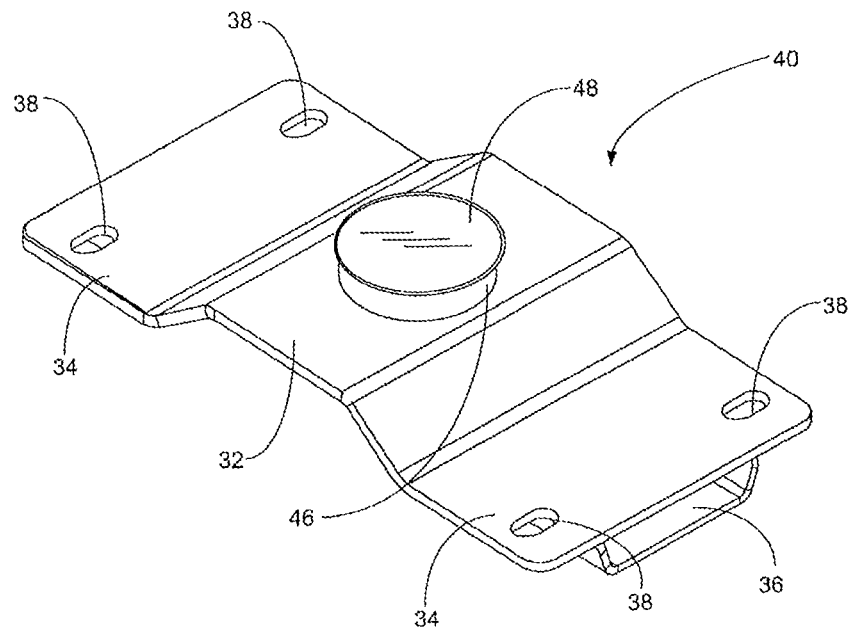
FIG. 3 illustrates a perspective view of an adapter plate.

The adapter plate 40 may be of a one piece construction or may include several sections that may be secured together. The adapter plate 40 may include a center section 32 and one or more mounting sections 34 extending therefrom. For example, there may be two mounting sections 34 (FIGS. 3 and 29). As an alternative, there may be no mounting sections 34, such that the center section may be attached directly to the rails 20 (FIGS. 4-6, 11-16, and 20-31).

The center section 32 may be located between the mounting sections 32. The mounting sections 34 may extend at a downward angle and away from the center section 32, such that the center section 32 may be positioned above the mounting sections 34. The mounting sections 34 may extend in opposite directions away from the center section 32.

The mounting sections 34 may engage the rails 20 at any appropriate location, such as the underside of the rails 20. The mounting sections 34 may be configured to connect to the rails 20 by any appropriate means, such as with fasteners, welding, monolithically formed, or the like. When the mid rail 40 is connected to the rails 20, the center section 32 may be approximately flush with and parallel to the rails 20 (FIGS. 3 and 4). When the mounting section 34 engages the rails 20, the mounting sections 34 may be approximately parallel to the rails 20. Each mounting section 34 may include one or more openings or rail mounting apertures 38. The mounting apertures 38 may be configured to align with the mounting apertures 28 in the rails 20. The mounting apertures 38 may be of any appropriate shape or size, such as a generally circular, ovular or rectangular shape.

Figure 6:
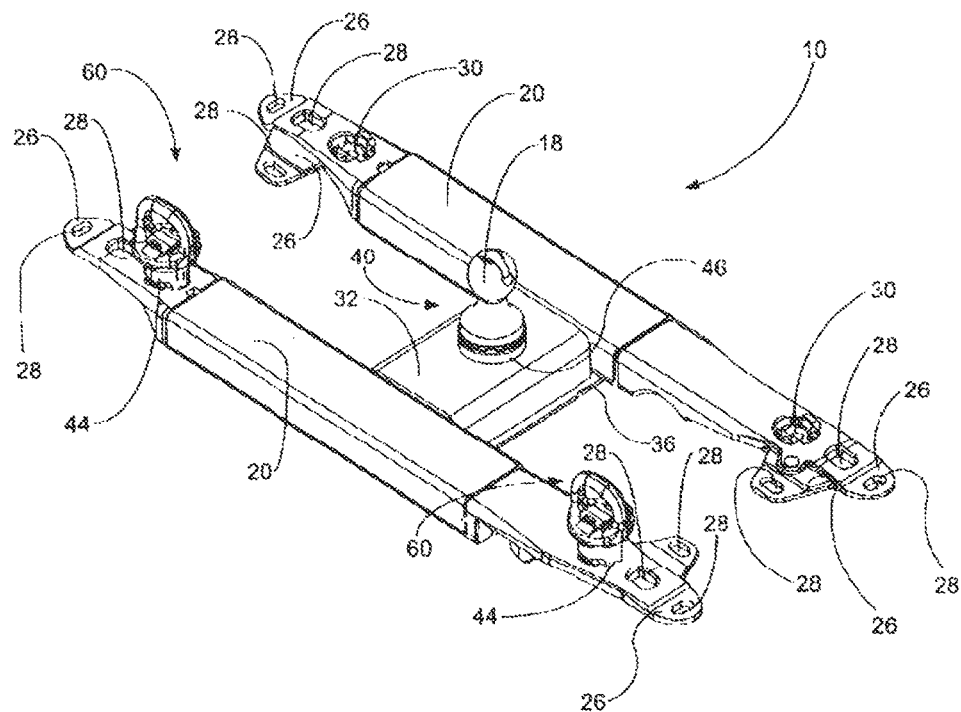
FIG. 6 illustrates a perspective view of an embodiment of the underbed hitch mounting system.

The adapter plate or mid rail 40 may also include a base member 36 (FIGS. 3 and 6). The base member 36 may be of any appropriate shape or size, such as a generally square, rectangular or tubular shape. The base member 36 may be attached to the bottom of the adapter plate or mid rail 40. The base member 36 may be attached to the mid rail 40 by any appropriate means, such as by welding, fasteners, monolithically formed, or the like. The base member 36 may also be secured to the rails 20, such as on the underside of the rails 20 (FIGS. 4 and 6).

The adapter plate or mid rail 40 may be configured to receive a hitch ball 18 (see FIGS. 3 and 4-6). For example, the center section 32 may include a hitch ball socket 42 that may be configured to receive the hitch ball 18. The hitch ball socket 42 may be of any appropriate shape or size, such as a generally cylindrical shape. The hitch ball socket 42 may be located at any appropriate position on the adapter plate 40, such as the approximate center of the adapter plate 40. For example, the hitch ball socket 42 may be configured to receive a removable hitch ball 18 with spring-loaded ball bearings. It should be appreciated, however, that the receptacle may be configured to receive any appropriate type of hitch ball 18 and should not be limited to that shown or described herein.

The hitch ball socket 42 may include a raised collar 46 and a cap 48 (FIG. 3). The raised collar 46 may be of any appropriate shape or size, such as one that may extend above and approximately perpendicularly to the surface of the center section 32. The cap 48 may be of any appropriate shape or size, such as one that may engage the collar 46 and cover the hitch ball socket 42 when a hitch ball 18 is not connected to the hitch ball socket 42.

Figure 5:
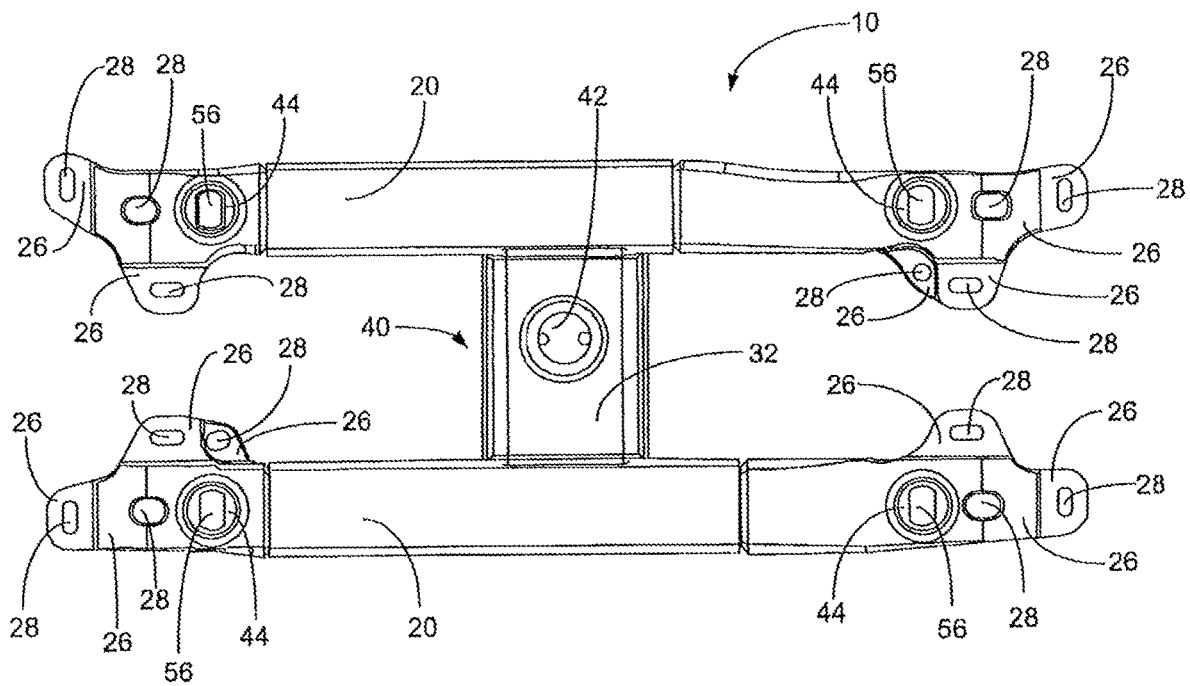
FIG. 5 illustrates a top view of the underbed hitch mounting system of FIG. 4.

FIGS. 4-6 illustrate another embodiment of the underbed hitch mounting system 10. The underbed hitch mounting system 10 may utilize a puck mounting system whereby the trailer hitch may be installed in the pickup truck bed with only four small holes (not shown). Utilizing a puck mounting system may provide uninhibited use of the truck bed when the hitch is dismounted. The puck mounting system may also provide for a wider platform and mounting surface, which increases the stability. The puck mounting system may be used with any appropriate trailer hitch mounting kit, such as those that utilize rail mounts or cross members 20 for example, such as with the "Signature Series" produced and sold by Cequent.

The underbed hitch mounting system 10 may include at least two rails or cross members 20. The cross members 20 may include sockets 30 for attachment with a puck or receiving member 44. The cross members 20 may be attached to the vehicle framework 52 by any appropriate means, such as with fasteners, by welding or the like.

Holes may be drilled in the truck bed corresponding to the locations of the sockets 30 in the rails 20 and the hitch ball socket 42. A fifth wheel hitch may be removably connected to the sockets 30 in the rails 20 through the holes located in the truck bed. A hitch ball 18 may be removably connected to the hitch ball socket 42 through the hole in the truck bed, whereby a gooseneck hitch may be utilized.

The cross members 20 may be mounted to the truck bed with the use of the receiving members 44. Each receiving member 44 may be mounted in a socket 30 provided in either of the cross members 20. The receiving member 40 may be secured in the socket 30 by any appropriate means, such as with fasteners, welding or the like. For example, a fastener, such as a bolt, could pass through an aperture in the bottom wall of the cross member 20 and be secured in place by a cooperating nut and lock washer (not shown) if desired.

The puck or receiving member 44 may be of any appropriate shape or size, such as a cylindrical, oval, or a square shape, for example, and should not be limited to that shown and described herein. The receiving member 44 may be a one-piece integrally formed member. Each receiving member 44 may also include an aperture 56 that may receive an accessory member 60. The aperture 56 may also be correspondingly shaped and sized to receive the accessory member 60. Any number or variety of accessories 60 may be utilized with the receiving members 44. The accessory member 60 may be any appropriate or desired type of object, such as a cap or a safety chain tie down member. For example, caps (not shown) may be placed over the receiving members 44 or holes in the truck bed when the hitch is not in use.

FIGS. 4 and 5 illustrate an integrally formed mounting system 10, whereby the receiving members 44 may be formed within the cross members 20. FIG. 6 illustrates a mounting system 10 where the receiving members 44 may be placed and secured into sockets 30 located within the cross members 20. The cross members 20 may be attached to one another by the mid rail 40. The hitch ball socket 42 and corresponding hitch ball 18 may be located on the mid rail 40 (FIGS. 4-6).

The underbed hitch mounting system 10 may include any number or variety of mounting flanges 26 and mounting apertures 28 (FIGS. 4-6). The mounting flanges 26 may be of any appropriate shape or size, such as generally rectangular or circular. The mounting flanges 26 may be located at any appropriate position on the rails 20, such as adjacent or at the ends of the rails 20. The mounting apertures 28 may be located in or around the mounting flanges 26. The mounting apertures 28 and mounting flanges 26 may aid in attached the mounting system 10 to the underbed of the towing vehicle or the vehicle framework 52.

Additional embodiments of an underbed hitch mounting system according to the present teachings are described below. In the descriptions, all of the details and components are described and, in some instances, differences with the above-described embodiments may be pointed out. Moreover, it should be appreciated that these additional embodiments may include elements or components utilized in the above-described embodiments although not shown or described. Thus, the descriptions of these additional embodiments are merely exemplary and not all-inclusive nor exclusive. Moreover, it should be appreciated that the features, components, elements, and functionalities of the various embodiments may be combined or altered to achieve a desired underbed hitch mounting system without departing from the spirit and scope of the present teachings.

Figure 8:
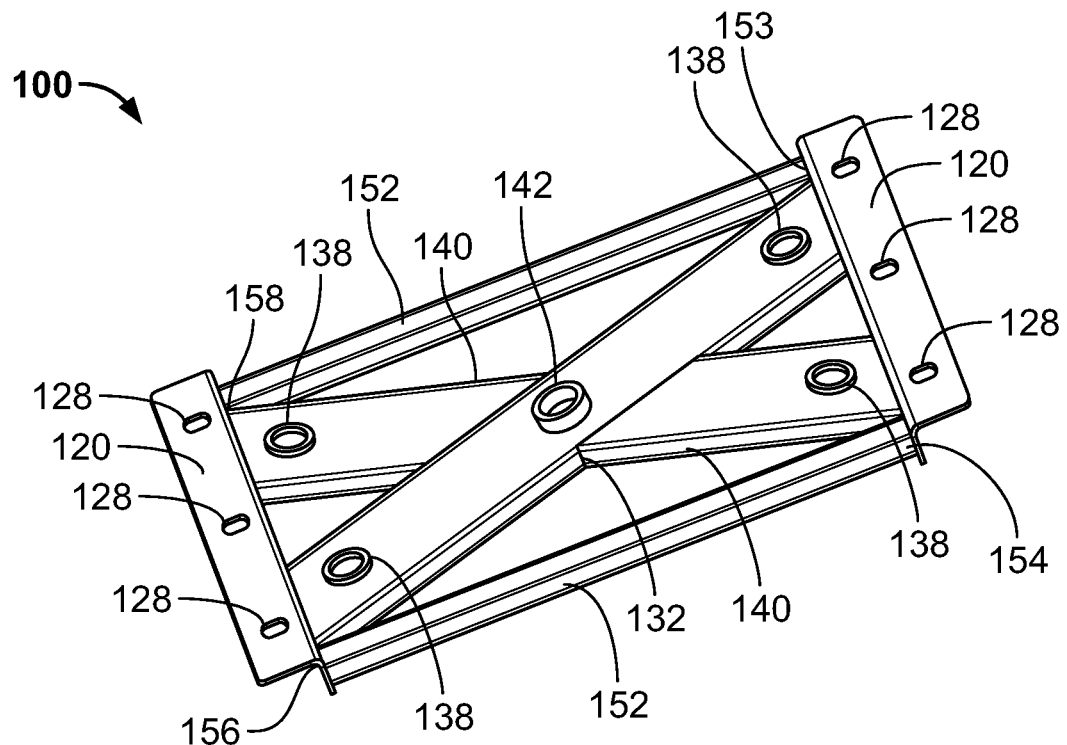
FIG. 8 illustrates a top perspective view of an underbed hitch mounting system in an embodiment of the invention.
Figure 9:
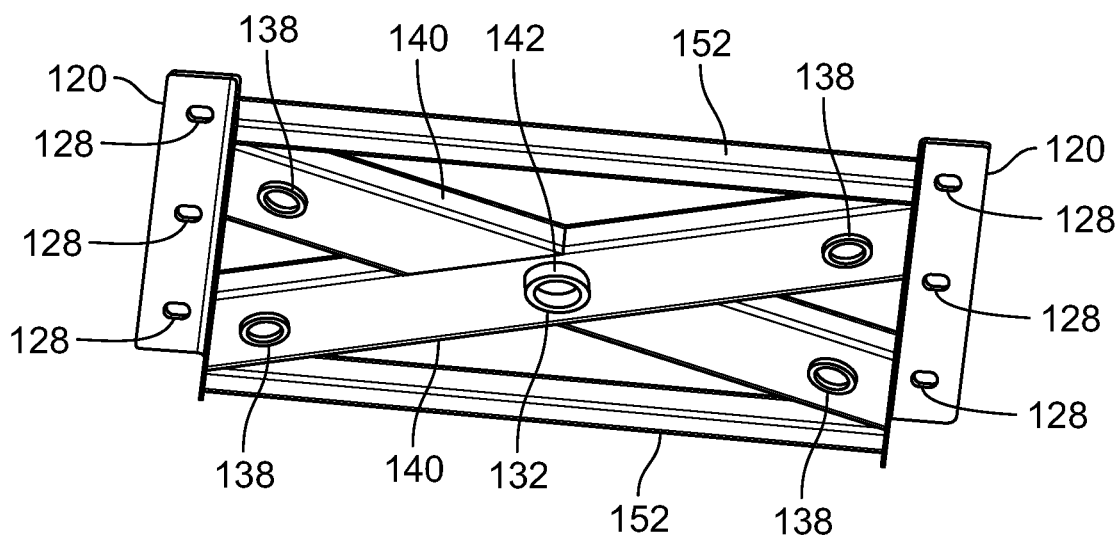
FIG. 9 illustrates a bottom perspective view of the underbed hitch mounting system of FIG. 8.
Figure 10:
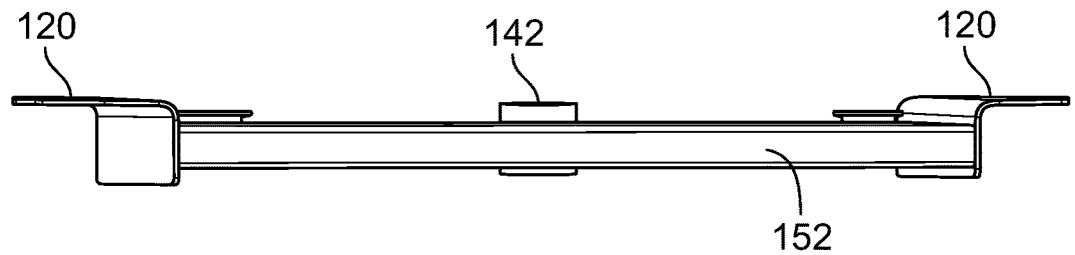
FIG. 10 illustrates a side view of the underbed hitch mounting system of FIG. 8.

As shown in FIGS. 8-10, the underbed hitch mounting system 100 may include two generally parallel rails 120. The parallel rails 120 may be attached to the vehicle framework 152 in a generally perpendicular manner, wherein the end of a rail 120 meets the end of a framework 152 at a generally right angle. The rails 120 may be connected to the framework 152 by any appropriate means, such as with fasteners, welding or the like. The underbed hitch mounting system 100 may include two mid rails 140 configured in a generally X-shape wherein a first end of each mid rail 140 meets at a generally first right angle 153, 154 formed between the parallel rail 120 and the framework 152 and a second end of each mid rail 140 meets a generally second right angle 156, 158 formed between the parallel rail 120 and the framework 152 diagonal from the first right angle 153, 154. The rails 140 may be connected by any appropriate means, such as with fasteners, welding, monolithically formed, or the like. The mid rails 140 may include one or more openings or rail mounting apertures 138. The mounting apertures 138 may be configured to align with the mounting apertures 128 in the rails 120. Further, the rails 140 may include a hitch ball socket 142 on a central portion 132 of the rails 140. The central portion 132 may be located where the two rails 140 overlap.

Figure 11:
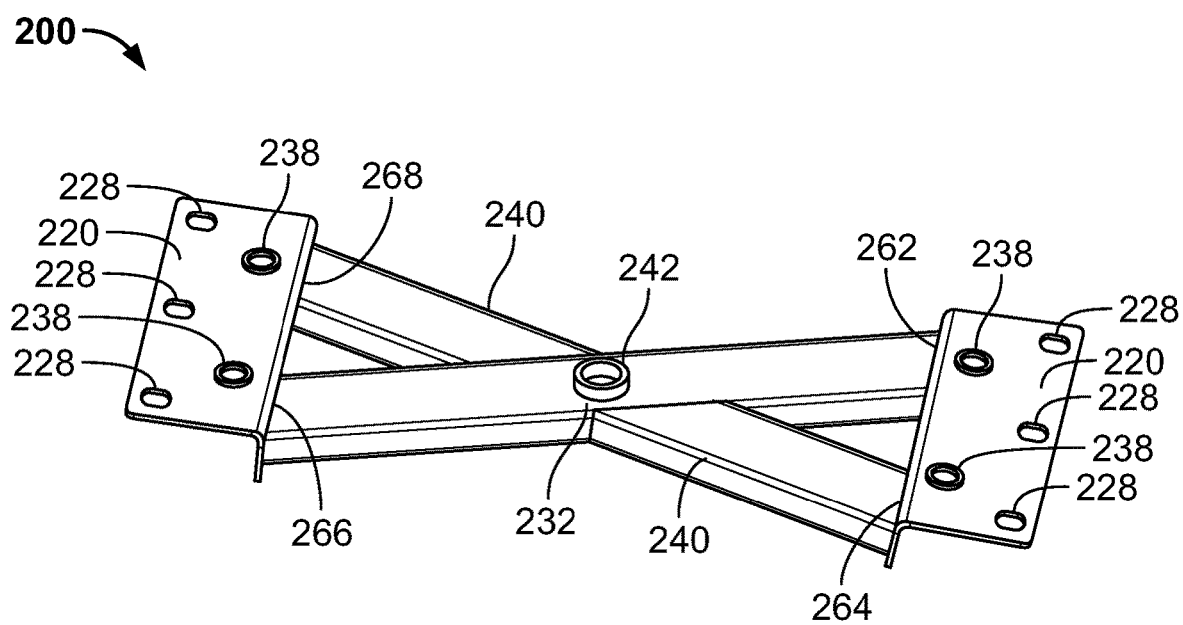
FIG. 11 illustrates a top perspective view of an underbed hitch mounting system in an embodiment of the invention.
Figure 12:
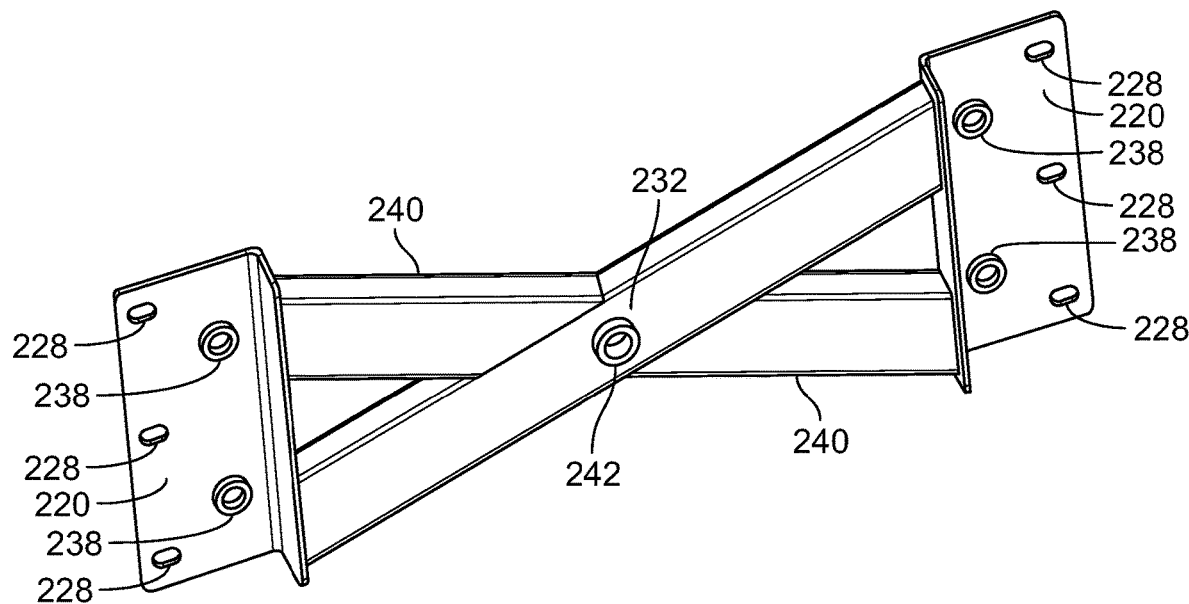
FIG. 12 illustrates a bottom perspective view of the underbed hitch mounting system of FIG. 11.
Figure 13:
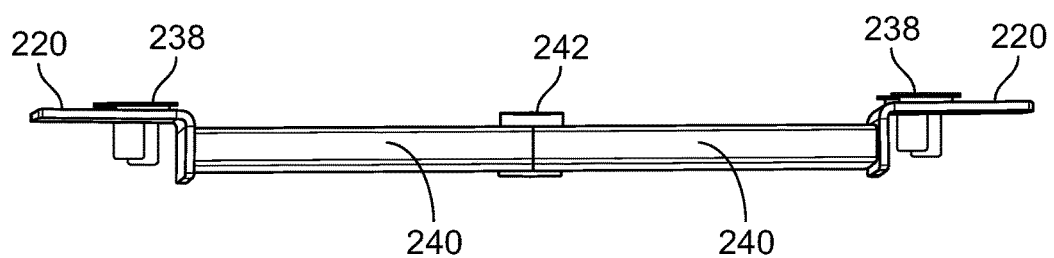
FIG. 13 illustrates a side view of the underbed hitch mounting system of FIG. 11.

As shown in FIGS. 11-13, the underbed hitch mounting system 200 may include two generally parallel rails 220, which may include mounting apertures 228. The underbed hitch mounting system 200 may include two mid rails 240 configured in a generally X-shape wherein a first end of each mid rail 240 meets at an end 262, 264 of the parallel rail 220 and a second end of each mid rail 240 meets at an end 266, 268 of the parallel rail 220 from end 262, 264. The rails 240 may be connected by any appropriate means, such as with fasteners, welding, monolithically formed, or the like. The mid rails 240 may include one or more openings or rail mounting apertures 238. Further, the rails 240 may include a hitch ball socket 242 on a central portion 232 of the rails 240. The central portion 232 may be located where the two rails 240 overlap.

Figure 15:
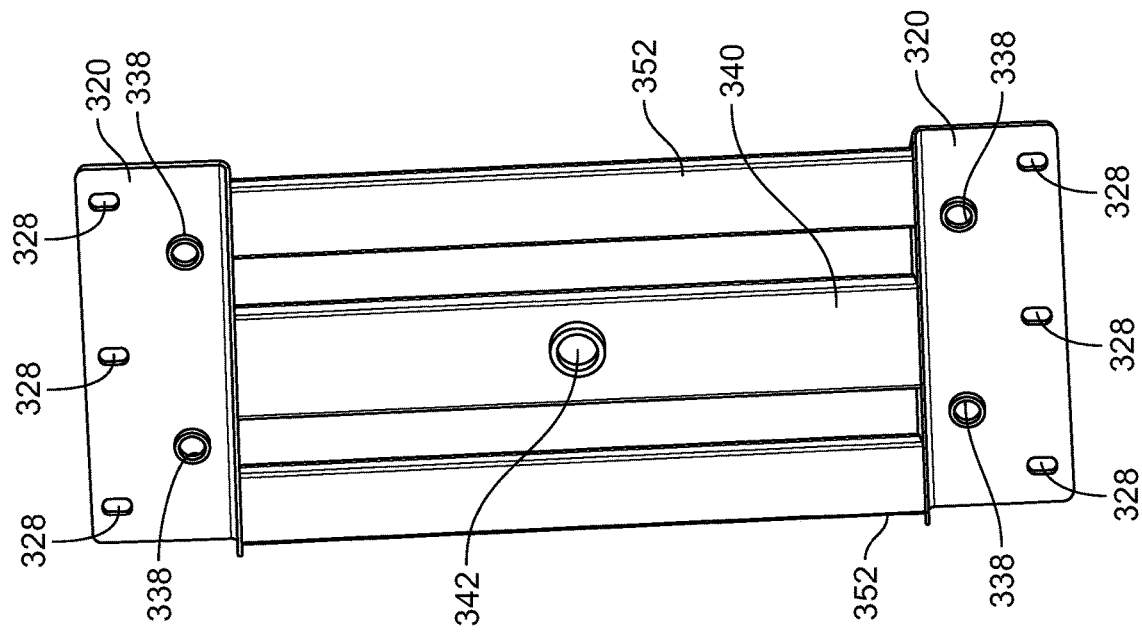
FIG. 15 illustrates a bottom perspective view of the underbed hitch mounting system of FIG. 14.
Figure 14:
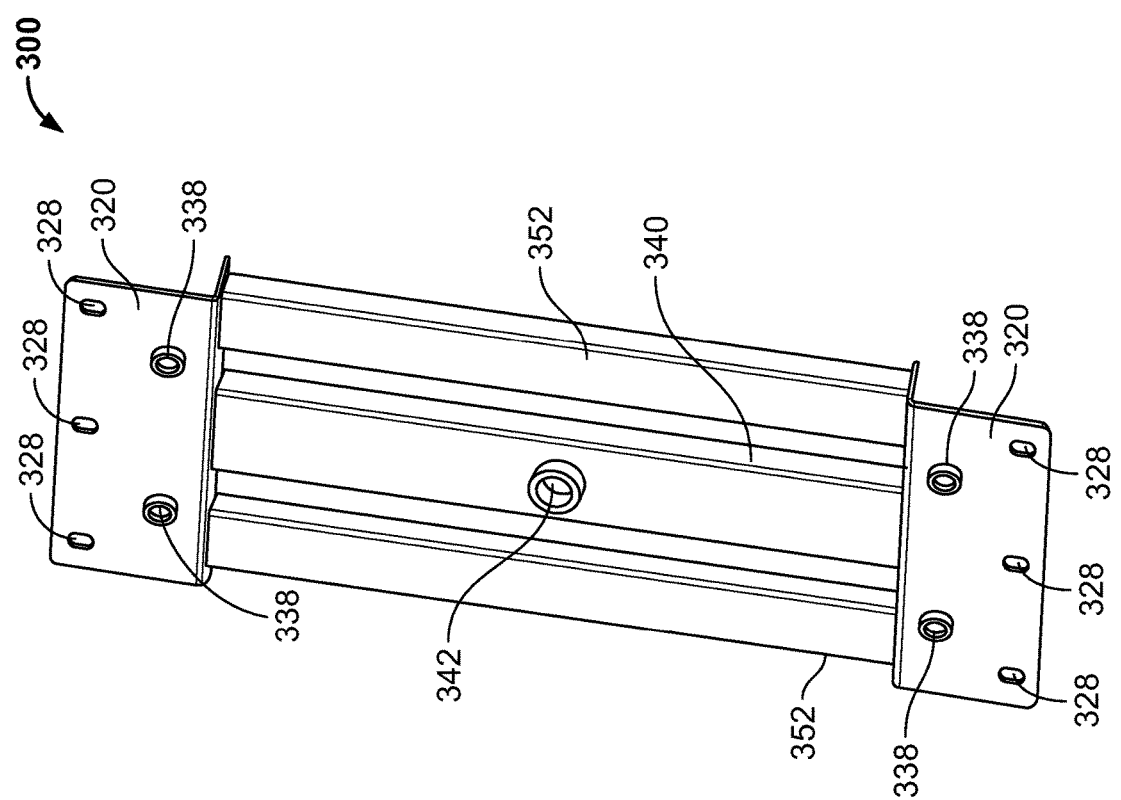
FIG. 14 illustrates a top perspective view of an underbed hitch mounting system in an embodiment of the invention.
Figure 16:
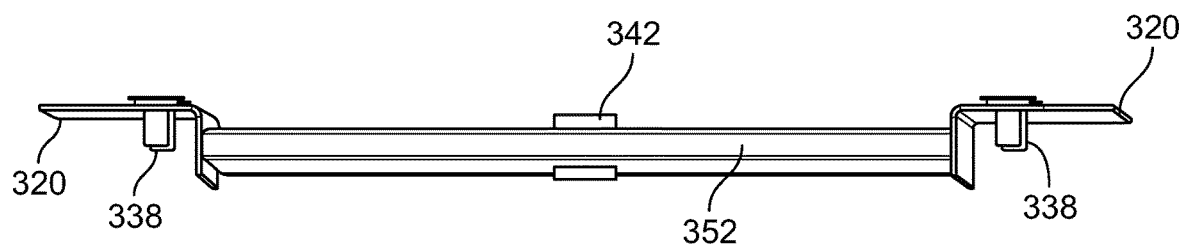
FIG. 16 illustrates a side view of the underbed hitch mounting system of FIG. 14.

As shown in FIGS. 14-16, the underbed hitch mounting system 300 may include two generally parallel rails 320. The parallel rails 320 may be attached to the vehicle framework 352 in a generally perpendicular manner, wherein the end of a rail 320 meets the end of a framework 352 at a right angle. The rails 320 may be connected to the framework 352 by any appropriate means, such as with fasteners, welding, monolithically formed, or the like. The underbed hitch mounting system 300 may include a mid rail 340 in between, and parallel to, the framework 352, with a first end generally perpendicularly connecting to a parallel rail 320 and a second end generally perpendicularly connecting to another parallel rail 320. The mid rail 340 may or may not contact the framework 352. The mid rail 340 may include one or more openings or rail mounting apertures 338. The mounting apertures 338 may be configured to align with the mounting apertures 328 in the rails 320. Further, the rail 340 may include a hitch ball socket 342.

Figure 17:
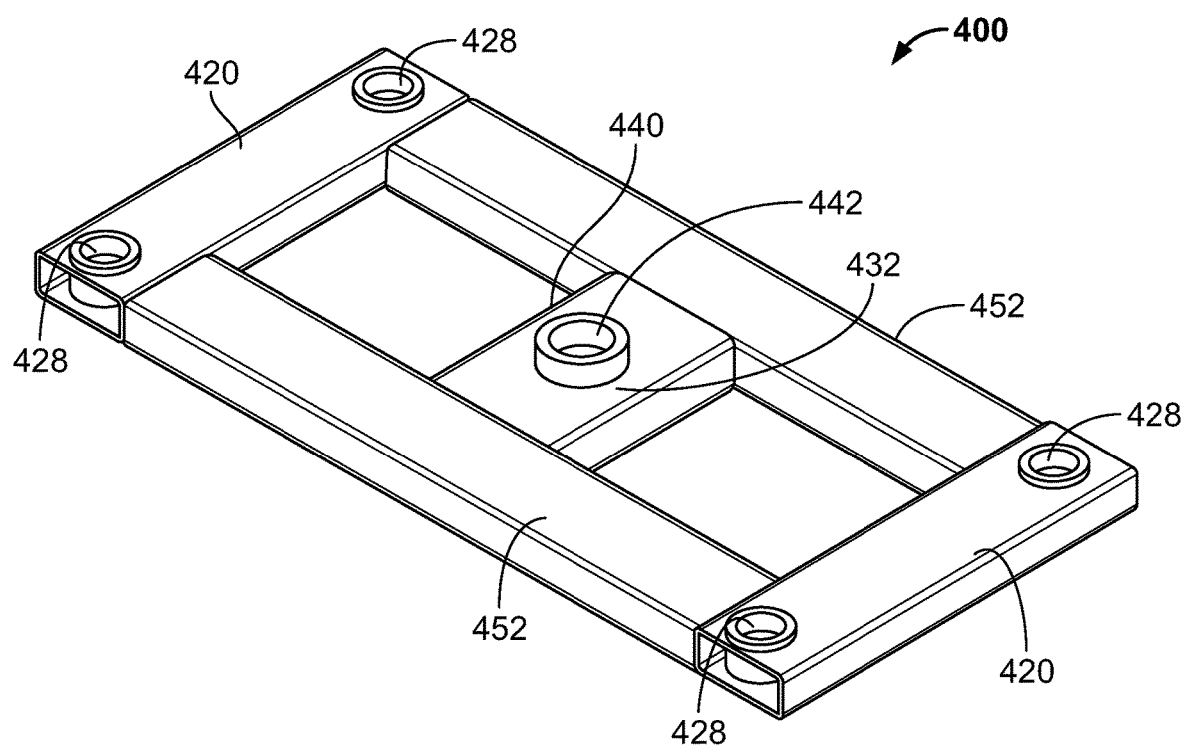
FIG. 17 illustrates a top perspective view of an underbed hitch mounting system in an embodiment of the invention.
Figure 18:
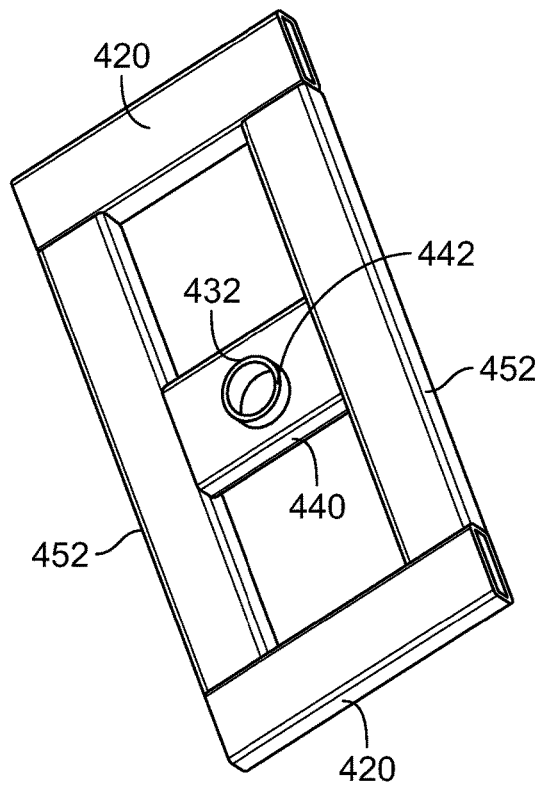
FIG. 18 illustrates a bottom perspective view of the underbed hitch mounting system of FIG. 17.
Figure 19:
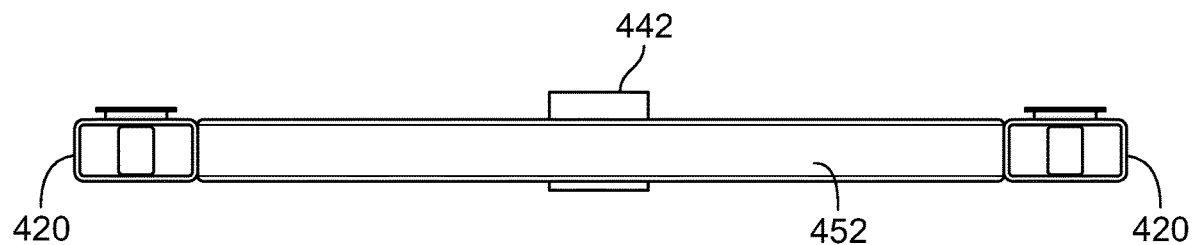
FIG. 19 illustrates a side view of the underbed hitch mounting system of FIG. 17.

As shown in FIGS. 17-19, the underbed hitch mounting system 400 may include two generally parallel rails 420 spaced apart from one another. The parallel rails 420 may be attached to the vehicle framework 452 in a generally perpendicular manner, wherein the end of a rail 420 meets the end of a framework 452 at a right angle. The rails 420 may be connected to the framework 452 by any appropriate means, such as with fasteners, welding, monolithically formed, or the like. The underbed hitch mounting system 400 may include a mid rail 440 in between, and generally perpendicular to, the framework 452, with a first end generally perpendicularly connecting to a framework 452 and a second end generally perpendicularly connecting to another framework 452. The mid rail 440 may or may not contact the parallel rails 420. The rails 440 may be connected by any appropriate means, such as with fasteners, welding, monolithically formed, or the like. The parallel rails 420 may include mounting apertures 428. Further, the rail 440 may include a hitch ball socket 442 on a central portion 432. In an embodiment, the underbed hitch mounting system 500 may also be an I-beam.

Figure 20:
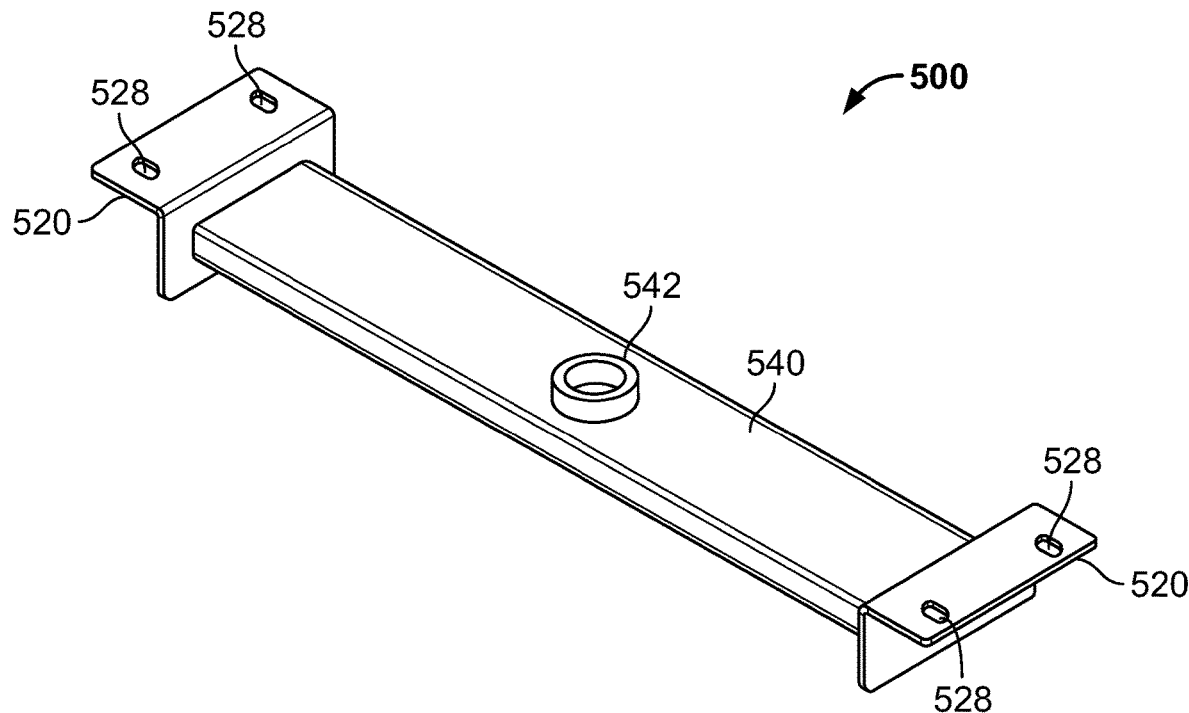
FIG. 20 illustrates a top perspective view of an underbed hitch mounting system in an embodiment of the invention.
Figure 21:
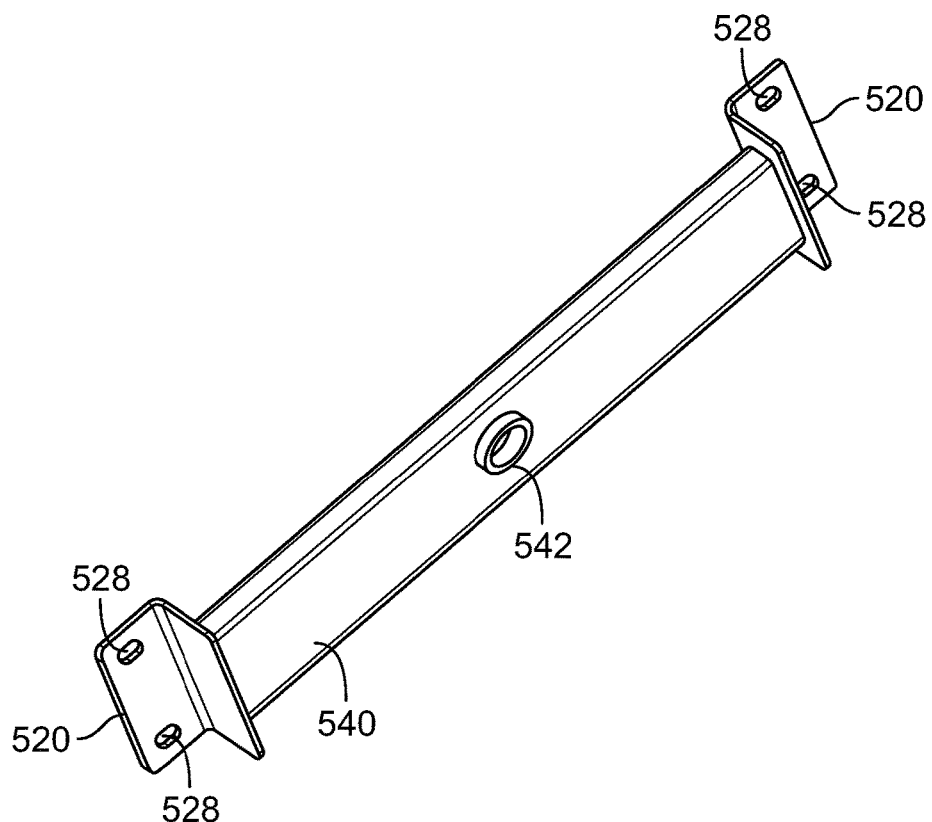
FIG. 21 illustrates a bottom perspective view of the underbed hitch mounting system of FIG. 20.
Figure 22:
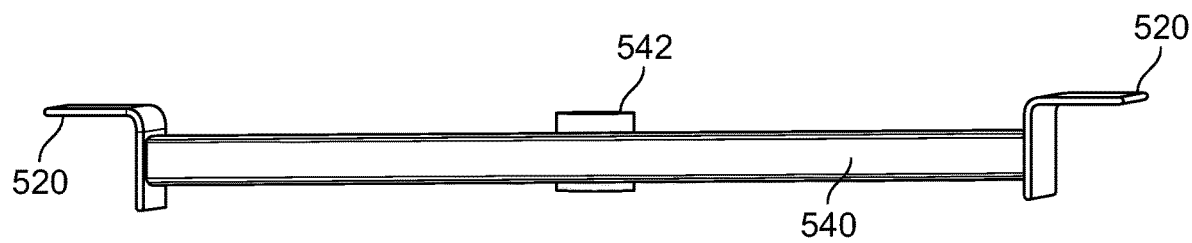
FIG. 22 illustrates a side view of the underbed hitch mounting system of FIG. 20.

As shown in FIGS. 20-22, the underbed hitch mounting system 500 may include two generally parallel rails 520. The underbed hitch mounting system 500 may include a mid rail 540 generally perpendicular to the parallel rails 520 with a first end generally perpendicularly connecting to a parallel rail 520 and a second end generally perpendicularly connecting to another parallel rail 520. The rails 520 and mid rails 540 may all be connected by any appropriate means, such as with fasteners, welding, monolithically formed, or the like. The mid rail 540 may include a hitch ball socket 542.

Figure 23:
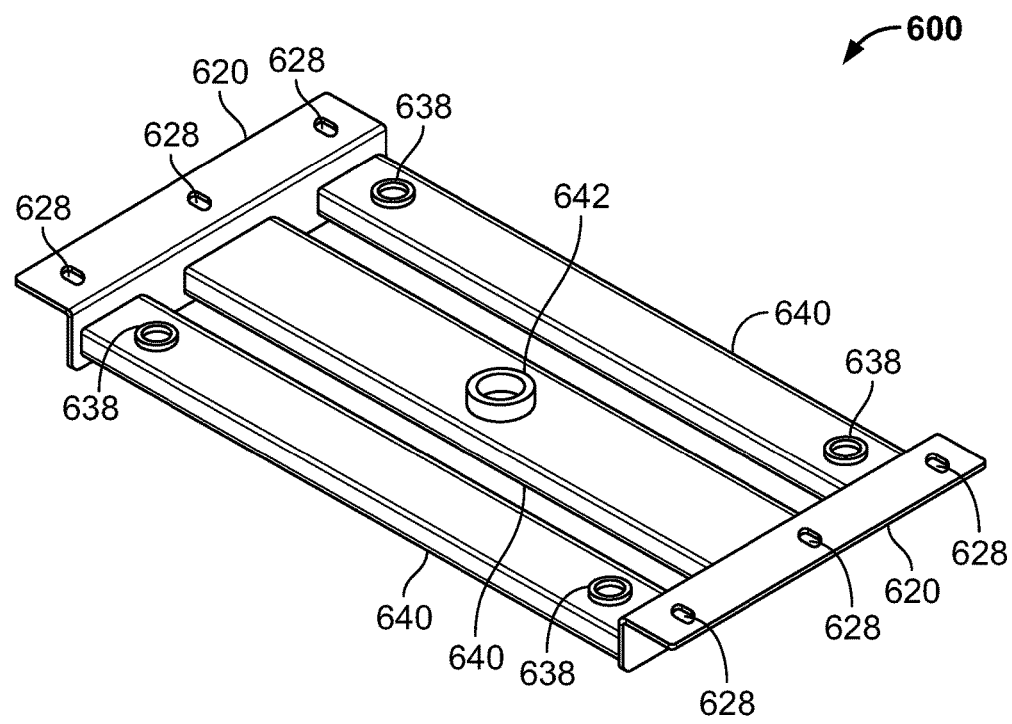
FIG. 23 illustrates a top perspective view of an underbed hitch mounting system in an embodiment of the invention.
Figure 24:
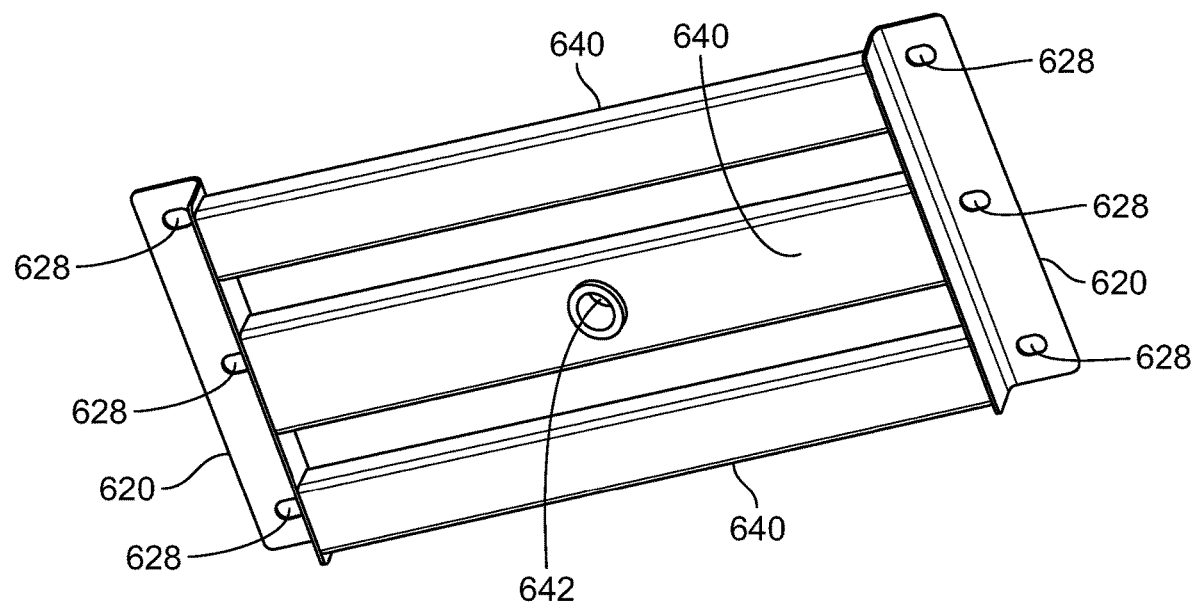
FIG. 24 illustrates a bottom perspective view of the underbed hitch mounting system of FIG. 23.
Figure 25:
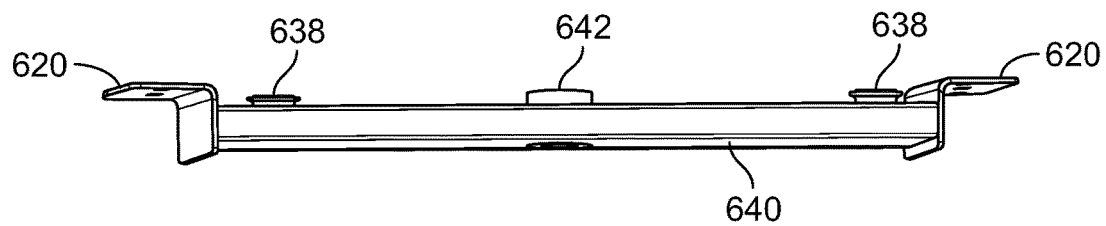
FIG. 25 illustrates a side view of the underbed hitch mounting system of FIG. 23.

As shown in FIGS. 23-25, the underbed hitch mounting system 600 may include two generally parallel rails 620. The underbed hitch mounting system 600 may include three generally parallel mid rails 640 generally perpendicular to the parallel rails 620 with a first end of each mid rail 640 generally perpendicularly connecting to a parallel rail 620 and a second end of each mid rail 640 generally perpendicularly connecting to another parallel rail 620. The mid rails 640 may or may not contact another mid rail 640. The rails 620 and mid rails 640 may all be connected by any appropriate means, such as with fasteners, welding, monolithically formed, or the like. The rails 640 may be connected by any appropriate means, such as with fasteners, welding, monolithically formed, or the like. The exterior mid rails 640 may include one or more openings or rail mounting apertures 638. The mounting apertures 638 may be configured to align with the mounting apertures 628 in the rails 620. Further, a central rail 640 may include a hitch ball socket 642.

Figure 26:
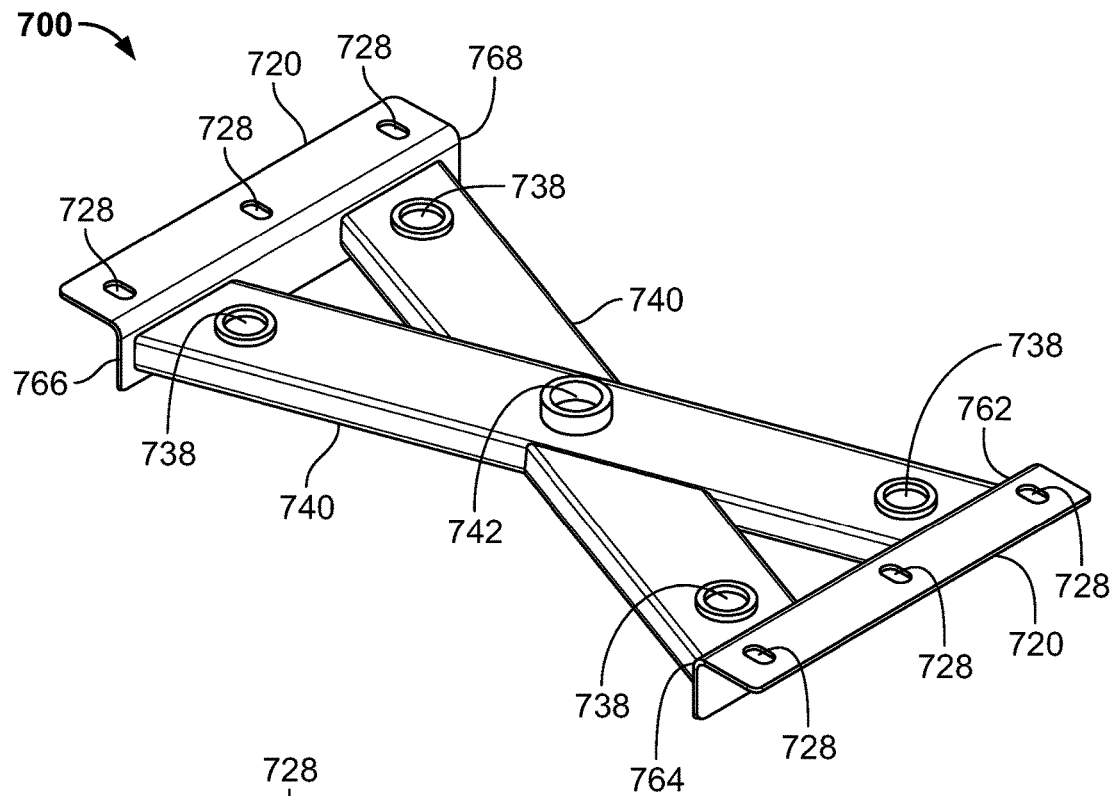
FIG. 26 illustrates a top perspective view of an underbed hitch mounting system in an embodiment of the invention.
Figure 27:
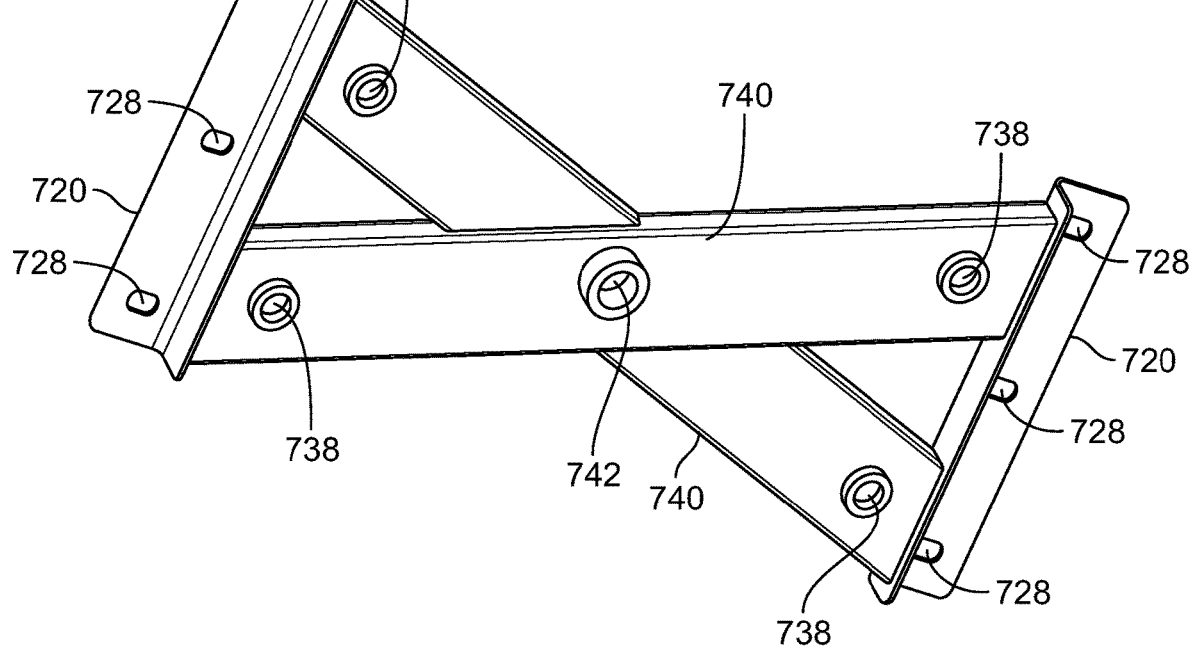
FIG. 27 illustrates a bottom perspective view of the underbed hitch mounting system of FIG. 26.
Figure 28:
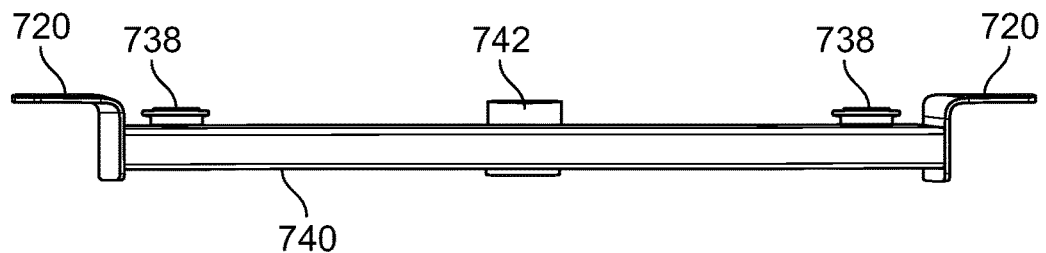
FIG. 28 illustrates a side view of the underbed hitch mounting system of FIG. 26.
Figure 29:
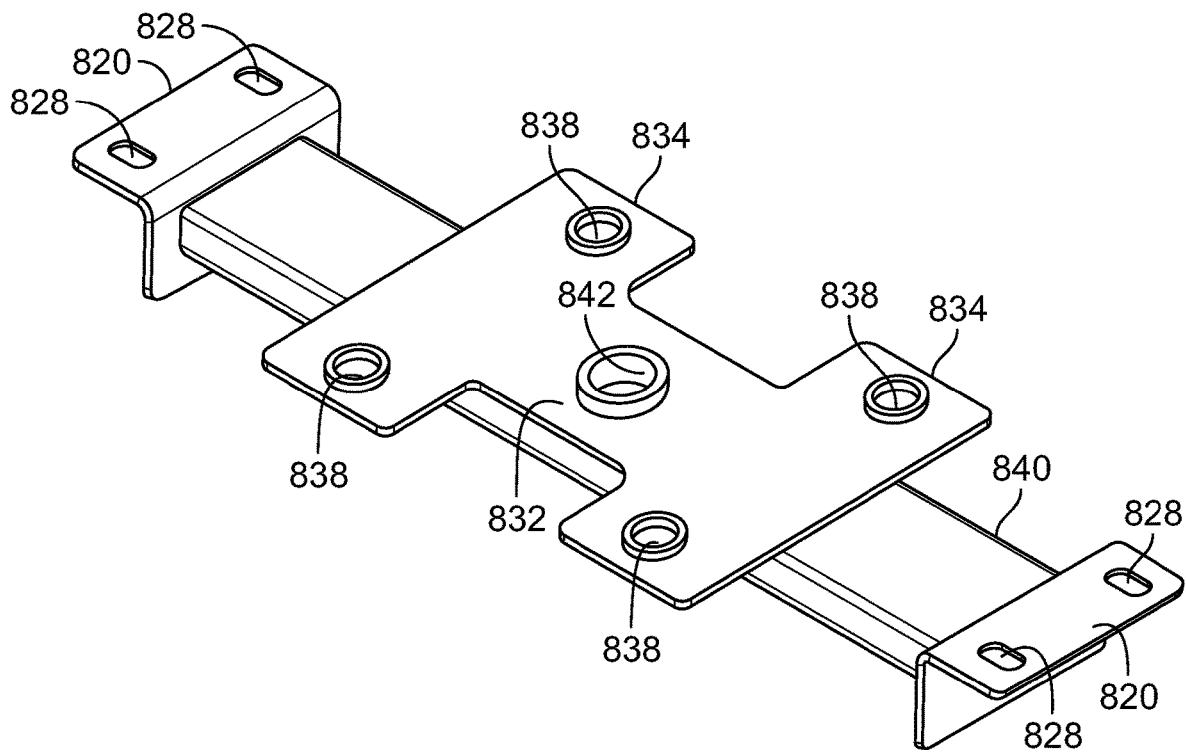
FIG. 29 illustrates a top perspective view of an underbed hitch mounting system in an embodiment of the invention.

As shown in FIGS. 26-28, the underbed hitch mounting system 700 may include two generally parallel rails 720, which may include mounting apertures 728. The underbed hitch mounting system 700 may include two mid rails 740 configured in a generally X-shape wherein a first end of each mid rail 740 meets at an end 762, 764 of the parallel rail 720 and a second end of each mid rail 740 meets at an end 766, 768 of the parallel rail 720 from end 762, 764. The rails 720 and mid rails 740 may all be connected by any appropriate means, such as with fasteners, welding, monolithically formed, or the like. The mid rails 740 may include one or more openings or rail mounting apertures 738. Further, the rails 740 may include a hitch ball socket 742 on a central portion 732 of the rails 740. The central portion 732 may be located where the two rails 740 overlap.

Figure 30:
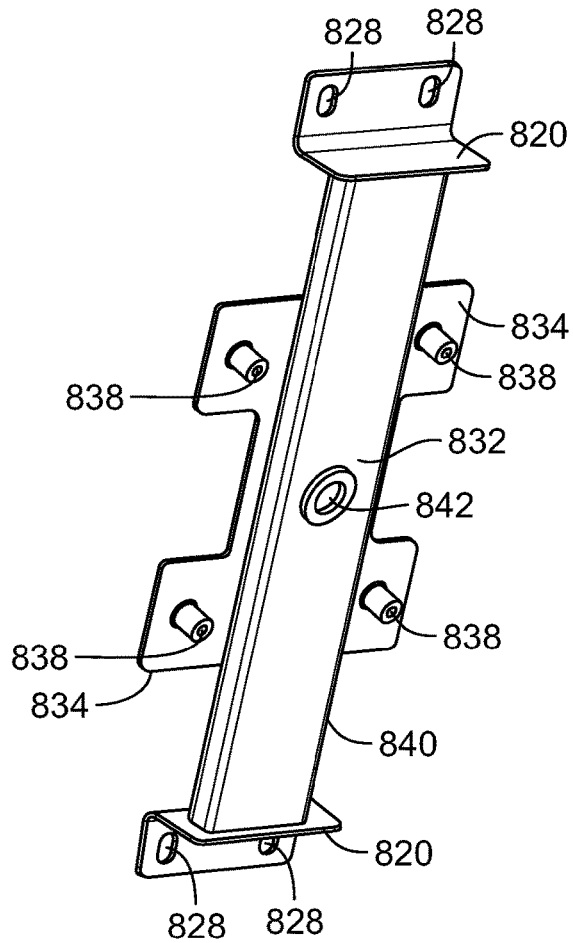
FIG. 30 illustrates a bottom perspective view of the underbed hitch mounting system of FIG. 29.
Figure 31:
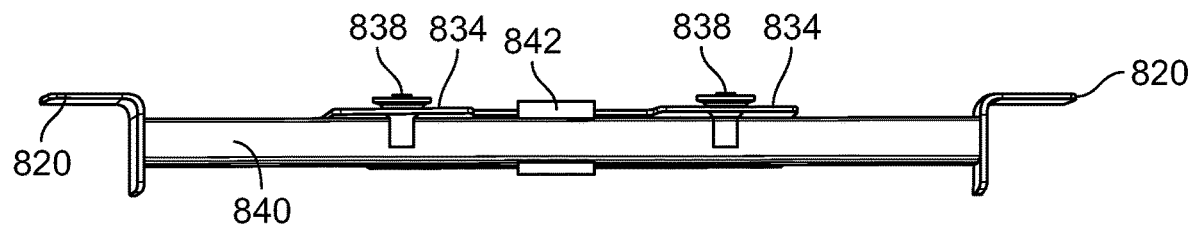
FIG. 31 illustrates a side view of the underbed hitch mounting system of FIG. 30.

As shown in FIGS. 29-31, the underbed hitch mounting system 800 may include two generally parallel rails 820. The underbed hitch mounting system 800 may include a mid rail 840 generally perpendicular to the parallel rails 820 with a first end generally perpendicularly connecting to a parallel rail 820 and a second end generally perpendicularly connecting to another parallel rail 820. The mid rail 840 may include a hitch ball socket 842 on a central portion 832. The rails 820 and mid rails 840 may all be connected by any appropriate means, such as with fasteners, welding, monolithically formed, or the like. The mid rail 840 may also include one or more mounting sections 834 extending therefrom. The mounting sections 834 may include one or more openings or rail mounting apertures 838. The mounting sections 834 may be configured at any appropriate angle including generally perpendicular to the mid rail 840 and parallel to another mounting section 834 as shown in FIGS. 29-31.

While the connections are shown as being attached, they may in some embodiments be monolithically formed or a portion thereof such as through forging, casting, or extrusion and bending.

Although the present embodiments have been illustrated in the accompanying drawings and described in the foregoing detailed description, it is to be understood that the invention is not to be limited to just the embodiments disclosed, and numerous rearrangements, modifications and substitutions are also contemplated. The exemplary embodiment has been described with reference to the preferred embodiments, but further modifications and alterations encompass the preceding detailed description. These modifications and alterations also fall within the scope of the appended claims or the equivalents thereof

What is claimed is:

1. An under bed hitch mounting system comprising:
   a first rail;
   a second rail spaced from the first rail and positioned parallel with the first rail, wherein the first and second rails are configured to attached to a frame of a vehicle;
   first, second and third mid rails positioned perpendicular with and between the first and second rails;
   a first pair of receiving members positioned in the first mid rail;
   a second pair of receiving members positioned in the second mid rail; and
   a hitch ball socket positioned in the third mid rail.

2. The under bed hitch mounting system of claim 1, wherein the first, second and third mid rails are parallel one another and spaced apart from one another.

3. The under bed hitch mounting system of claim 1, wherein the first and second pair of receiving members are configured to have a fifth wheel hitch secured thereto.

4. The under bed hitch mounting system of claim 1, wherein the first, second and third mid rails comprise rectangular tubular members.

5. The under bed hitch mounting system of claim 1 further comprising a fifth wheel hitch attached with the first and second pair of receiving members.

6. An under bed hitch mounting system comprising:
   a first rail;
   a second rail spaced from the first rail and positioned parallel with the first rail, wherein the first and second rails are configured to attached to a frame of a vehicle;
   first and second frame members attached between and perpendicular with the first and second rails, wherein the first and second frame members are spaced apart from one another;
   a first pair of receiving members positioned in the first rail;
   a second pair of receiving members positioned in the second rail; and
   a mid rail attached with the first and second rails between the first and second frame members.

7. The under bed hitch mounting system of claim 6 further comprising a hitch ball socket positioned in the mid rail.

8. The under bed hitch mounting system of claim 6, wherein the first and second pair of receiving members are configured to have a fifth wheel hitch secured thereto.

9. The under bed hitch mounting system of claim 6, wherein the first and second frame members comprise rectangular tubular members.

10. The under bed hitch mounting system of claim 6 further comprising a fifth wheel hitch attached with the first and second pair of receiving members.

11. An under bed hitch mounting system comprising:
    a first rail;
    a second rail spaced from the first rail, wherein the first and second rails are configured to attach to a frame of a vehicle;
    a mid rail attached between the first and second rail;
    a hitch ball socket positioned in the mid rail;
    a first mounting section positioned on the mid rail; and
    a first pair of receiving members positioned on the first mounting section.

12. The under bed hitch mounting system of claim 11, wherein the mid rail is perpendicular with the first and second rails.

13. The under bed hitch mounting system of claim 11 further comprising a second mounting section positioned on the mid rail; and a second pair of receiving members positioned on the second mounting section.

14. The under bed hitch mounting system of claim 13, wherein the first and second pair of receiving members are configured to have a fifth wheel hitch secured thereto.

15. The under bed hitch mounting system of claim 13 further comprising a fifth wheel hitch attached with the first and second pair of receiving members.

* * * * *